US009578255B2

United States Patent
Aoyama

(10) Patent No.: US 9,578,255 B2
(45) Date of Patent: Feb. 21, 2017

(54) IMAGE PICKUP APPARATUS CAPABLE OF REDUCING INFLUENCE OF FLICKER, METHOD OF CONTROLLING THE SAME, AND STORAGE MEDIUM

(71) Applicant: CANON KABUSHIKI KAISHA, Tokyo (JP)

(72) Inventor: Yuuzou Aoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/755,860

(22) Filed: Jun. 30, 2015

(65) Prior Publication Data

US 2016/0006919 A1    Jan. 7, 2016

(30) Foreign Application Priority Data

Jul. 2, 2014    (JP) ................................ 2014-136622

(51) Int. Cl.
*H04N 5/235* (2006.01)
*G01J 1/42* (2006.01)

(52) U.S. Cl.
CPC .......... *H04N 5/2357* (2013.01); *G01J 1/4214* (2013.01); *H04N 5/2353* (2013.01)

(58) Field of Classification Search
CPC .... H04N 5/2357; H04N 5/2353; H04N 5/378; G01J 1/4214
See application file for complete search history.

(56) References Cited

U.S. PATENT DOCUMENTS

| | | | | |
|---|---|---|---|---|
| 2009/0033763 A1* | 2/2009 | Tsukihara | ............ | H04N 5/2357 348/226.1 |
| 2010/0123810 A1* | 5/2010 | Greenland | ............ | G03B 19/18 348/294 |
| 2012/0081569 A1* | 4/2012 | Yost | ............ | H04N 5/2353 348/226.1 |
| 2013/0222637 A1* | 8/2013 | Wu | ............ | H04N 5/2357 348/226.1 |
| 2013/0242143 A1* | 9/2013 | Chen | ............ | H04N 5/2357 348/241 |

FOREIGN PATENT DOCUMENTS

| | | |
|---|---|---|
| JP | 2004-193922 A | 7/2004 |
| JP | 2007-060585 A | 3/2007 |
| JP | 2007-243833 A | 9/2007 |

* cited by examiner

*Primary Examiner* — Timothy J Henn
(74) *Attorney, Agent, or Firm* — Cowan, Liebowitz & Latman, P.C.

(57) ABSTRACT

An image pickup apparatus capable of reducing influence of flicker while suppressing delay of start of photographing. An image pickup device and a photometric sensor pick up images of an object. A CPU obtains images by controlling driving of one of the device and the sensor to perform charge accumulation and charge readout. Further, the CPU detects a flicker frequency and a flicker phase of a flicker light source, and stores them in a memory as first information. When photographing, if the CPU determines that the first information is not valid, an ICPU obtains images by controlling driving of the other of them to perform charge accumulation and charge readout. Further, the ICPU detects the flicker frequency and the flicker phase and stores them in a memory as second information. The CPU controls exposure timing according to the second information to perform photographing.

10 Claims, 11 Drawing Sheets

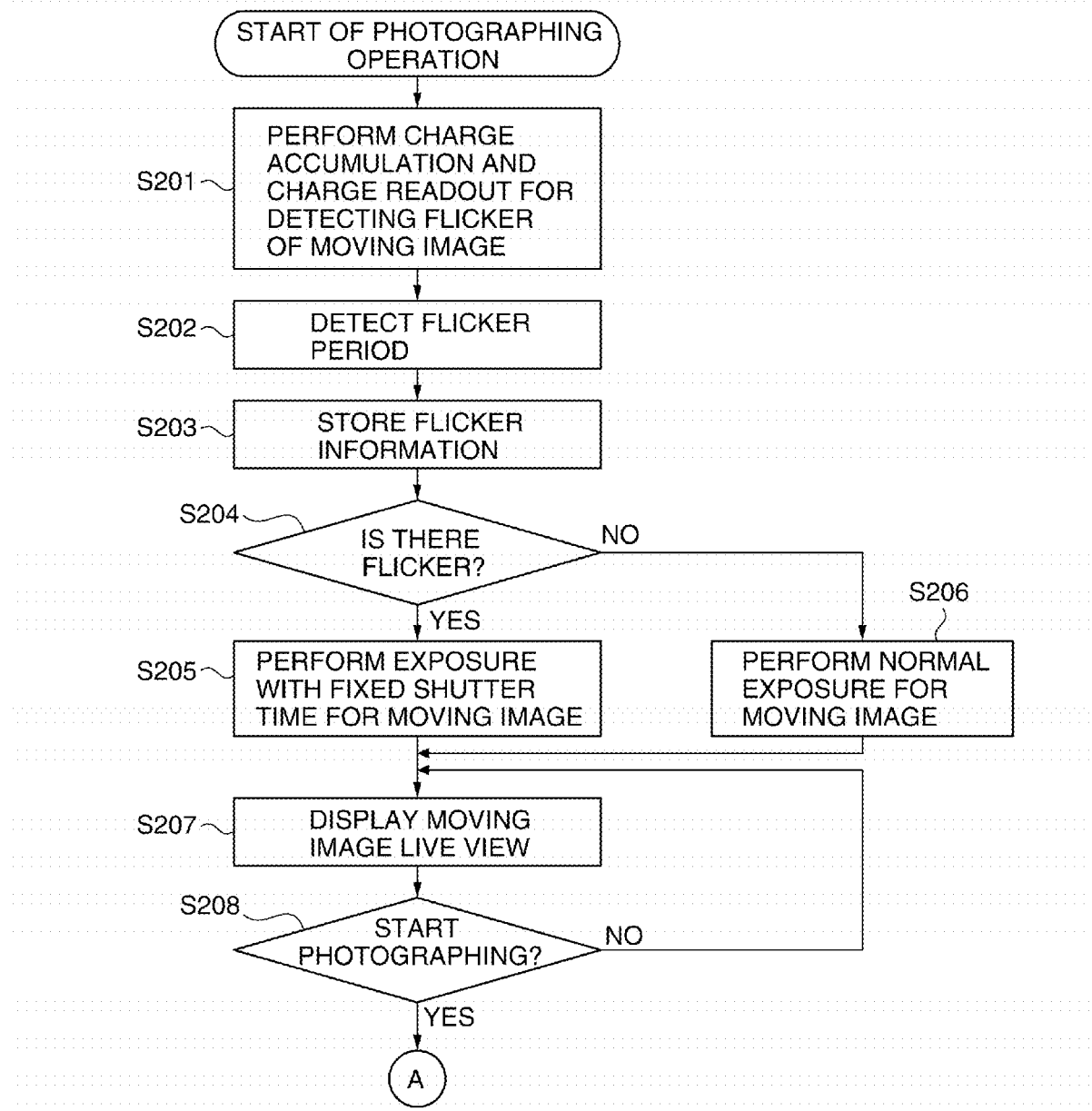

FIG. 3A
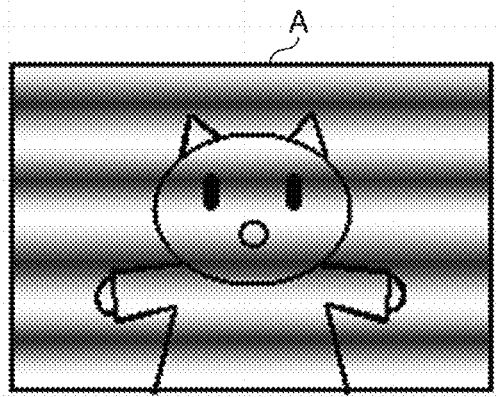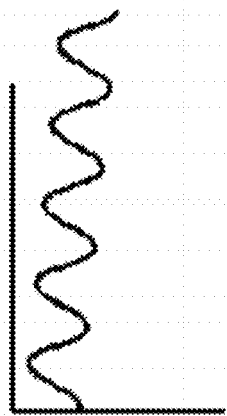
HORIZONTAL PROJECTION Ah
FIG. 3B
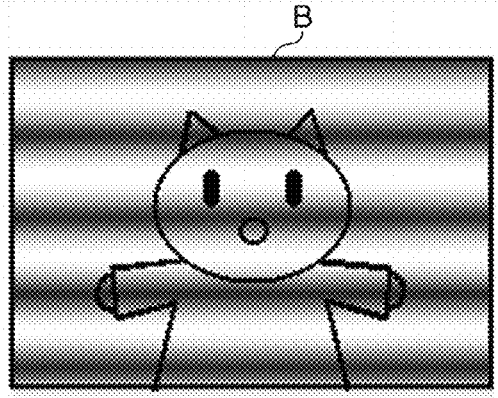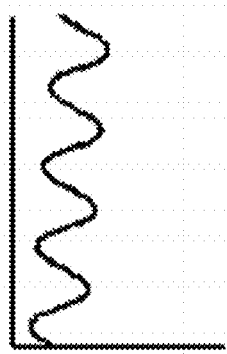
HORIZONTAL PROJECTION Bh

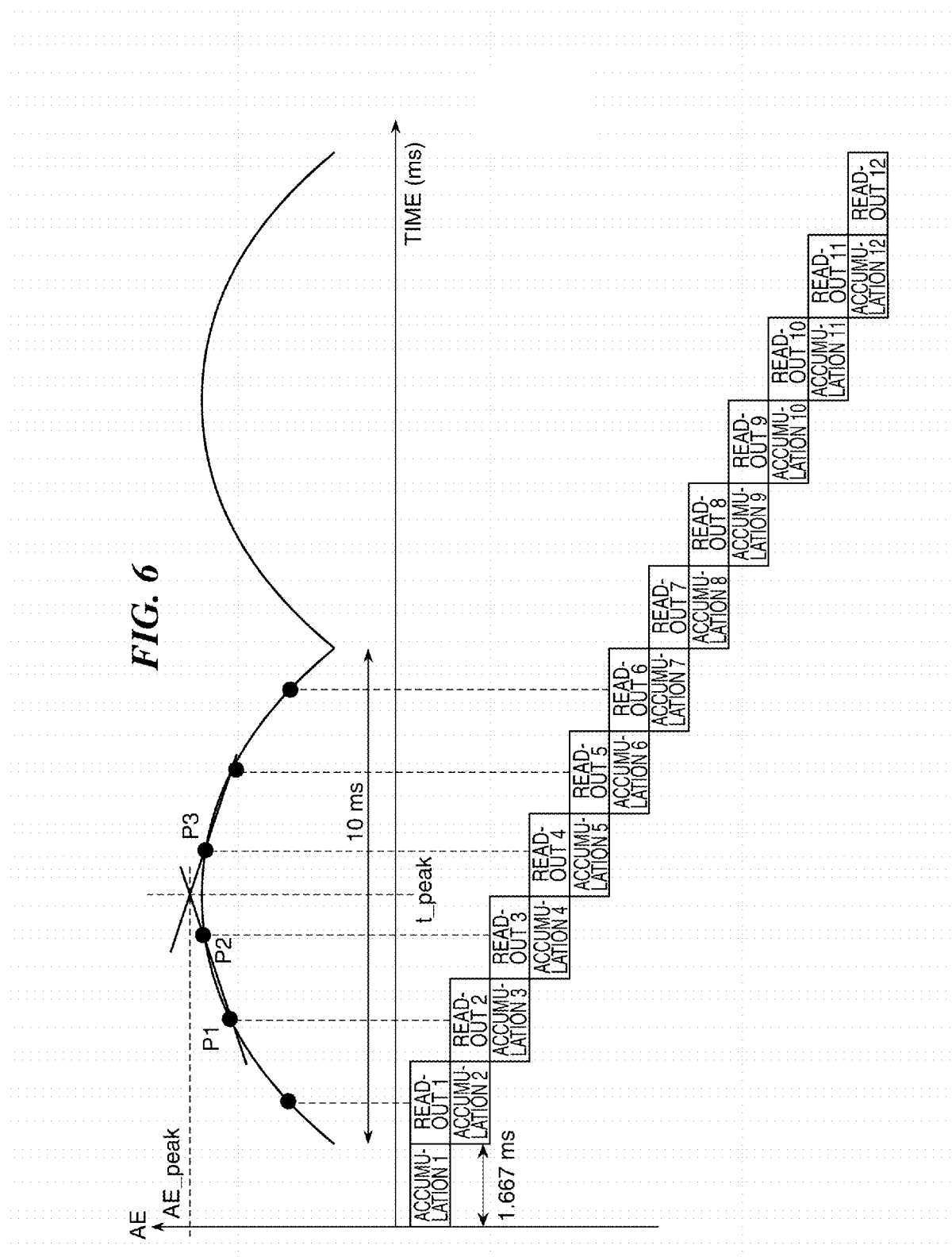

FIG. 8A

WHEN STORED FLICKER INFORMATION IS VALID AND THERE IS NO FLICKER

| DETECTION OF MOVING IMAGE FLICKER PERIOD | MOVING IMAGE LIVE VIEW | FLICKERLESS STILL IMAGE PHOTOGRAPHING |
|---|---|---|

FIG. 8B

WHEN STORED FLICKER INFORMATION IS VALID AND THERE IS FLICKER

| DETECTION OF MOVING IMAGE FLICKER PERIOD | MOVING IMAGE LIVE VIEW | FLICKER PHASE DETECTION | FLICKERLESS STILL IMAGE PHOTOGRAPHING |
|---|---|---|---|

FIG. 8C

WHEN STORED FLICKER INFORMATION IS NOZZZT VALID

| DETECTION OF MOVING IMAGE FLICKER PERIOD | MOVING IMAGE LIVE VIEW | DETECTION OF STILL IMAGE FLICKER PERIOD | FLICKER PHASE DETECTION | FLICKERLESS STILL IMAGE PHOTOGRAPHING |
|---|---|---|---|---|

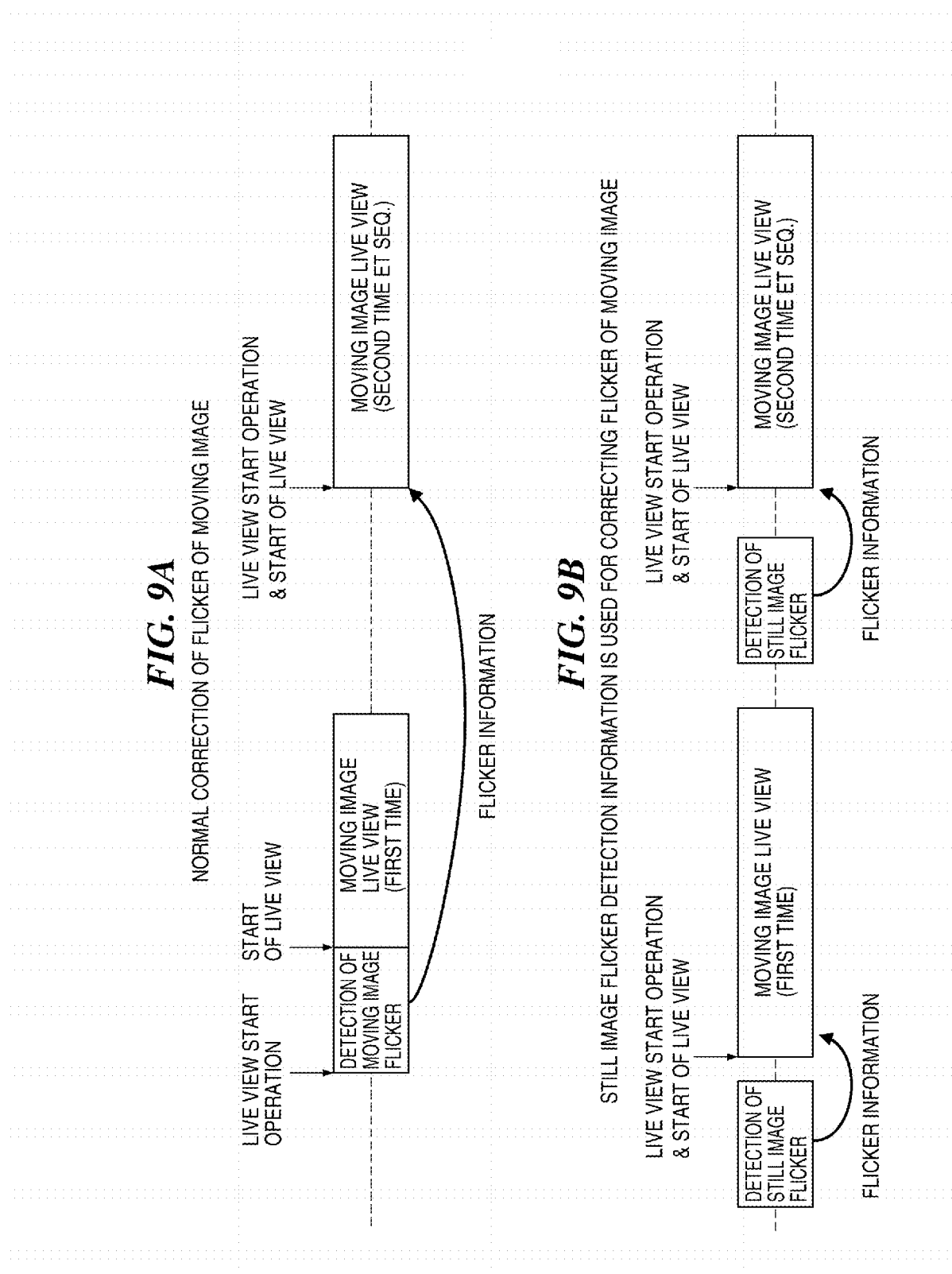

IMAGE PICKUP APPARATUS CAPABLE OF REDUCING INFLUENCE OF FLICKER, METHOD OF CONTROLLING THE SAME, AND STORAGE MEDIUM

BACKGROUND OF THE INVENTION

Field of the Invention

The present invention relates to an image pickup apparatus, such as a digital camera, a method of controlling the same, and a storage medium, and more particularly to an image pickup apparatus that is capable of detecting flicker and reducing the influence of the flicker when photographing is performed under an artificial light source, such as fluorescent lighting.

Description of the Related Art

In general, in an image pickup apparatus, such as a digital camera, an image signal obtained by a solid-state image pickup device, such as a CCD image sensor or a CMOS image sensor, is converted to a digital signal by analog-to-digital conversion, and is recorded as image data in a storage medium. Some of such image pickup apparatuses include a moving image photographing function in addition to a still image photographing function.

Incidentally, when moving images are photographed by an image pickup apparatus of the above-mentioned type under fluorescent lighting driven for lighting by a commercial power supply, brightness sometimes varies from frame to frame. Further, it is known that horizontal light and dark stripes are formed in the same frame.

Such light and dark variation is called flicker. Flicker caused by a commercial power supply frequency of 50 Hz can be reduced by controlling an electronic shutter at a shutter speed of n/100 sec (n is a natural number). Further, flicker caused by a commercial power supply frequency of 60 Hz can be reduced by controlling the electronic shutter at a shutter speed of n/120 sec.

To calculate a shutter speed (exposure time) for reducing flicker, it is necessary to calculate a period of flicker. For example, there has been proposed a method in which flicker is detected by integrating an image signal obtained by the CMOS image sensor over a time period not shorter than at least one horizontal period, and comparing integrated values of each two successive frames (see Japanese Patent Laid-Open Publication No. 2007-60585).

Further, when a still image is photographed under a flicker light source, if the photographing is performed with a high-speed shutter, variation in the exposure and color temperature of the still image is sometimes caused from one frame to another due to the influence of flicker. Further, also in the case of still image photographing, unevenness of exposure and unevenness of color are sometimes caused in one frame.

To cope with such exposure unevenness and color unevenness, there has been proposed e.g. an image pickup apparatus which is configured to reduce flicker by detecting the period and phase of flicker, and performing exposure in synchronism with a peak of the light amount of the flicker, at which the light and dark variation is small (see Japanese Patent Laid-Open Publication No. 2004-193922).

On the other hand, when reading control of an image pickup device is performed in order to detect flicker, a time delay is caused in the image pickup apparatus before the start of photographing. To solve this problem, there has been proposed an image pickup apparatus which includes a plurality of image pickup units (e.g. image pickup devices) and is configured such that flicker correction information is obtained for storage according to an image signal which is obtained by one of the image pickup units when the image pickup apparatus is operated (see Japanese Patent Laid-Open Publication No. 2007-243833).

In the image pickup apparatus disclosed in Japanese Patent Laid-Open Publication No. 2007-243833, when the image pickup unit is switched to another unit or when photographing is started next time, the stored flicker correction information is used, whereby photographing is immediately started and correction of flicker is performed without performing a flicker detection process again.

In the image pickup apparatus disclosed in Japanese Patent Laid-Open Publication No. 2007-243833, insofar as flicker correction information can be commonly used between the image pickup units, it is possible to perform correction of flicker. However, if it is impossible to commonly use flicker correction information between the image pickup units, it is required to acquire flicker correction information at least in one image pickup unit, again, which causes time delay before the start of photographing.

SUMMARY OF THE INVENTION

The present invention provides an image pickup apparatus which is capable of reducing the influence of flicker while suppressing a delay of the start of photographing, a method of controlling the image pickup apparatus, and a storage medium.

In a first aspect of the present invention, there is provided an image pickup apparatus that is used for photographing under a flicker light source, comprising a plurality of image pickup units each configured to pick up an image of an object, a first flicker detection unit configured to obtain a plurality of images by controlling driving of one of the plurality of image pickup units to perform charge accumulation and charge readout a plurality of times at predetermined time intervals according to an optical image indicative an image of the object, and detect a flicker frequency and a flicker phase of the flicker light source according to a plurality of photometric values obtained by performing photometry in each of the plurality of images, to store the flicker frequency and the flicker phase as first flicker information in a memory, a determination unit configured to determine, at time of photographing, whether or not the first flicker information is valid, according to determination conditions set in advance, a second flicker detection unit configured to obtain, when the determination unit determines that the first flicker information is not valid, a plurality of images by controlling driving of another of the plurality of image pickup units to perform charge accumulation and charge readout a plurality of times at predetermined time intervals according to an optical image indicative an image of the object, and detect a flicker frequency and a flicker phase of the flicker light source according to a plurality of photometric values obtained by performing photometry in each of the plurality of images, to store the flicker frequency and the flicker phase as second flicker information in a memory, and a first control unit configured to control exposure timing according to the second flicker information to perform photographing.

In a second aspect of the present invention, there is provided an image pickup apparatus comprising an image pickup unit, a first calculation unit configured to calculate light amount change characteristics of light from an object, based on a plurality of photometric values obtained at a period shorter than a first period, a second calculation unit configured to calculate the light amount change characteristics, based on luminance change information with a reference image, the reference image being an image obtained through charge accumulation using the image pickup unit while differentiating start timing on a region-by-region basis by taking more time than required to obtain the plurality of photometric values by the image pickup unit, a memory configured to store characteristics information concerning the light amount change characteristics calculated based on the plurality of photometric values by the first calculation unit, a suppression processing unit configured to perform suppression processing for suppressing influence of change in an amount of light from an object, on an image acquired by the image pickup unit, and a control unit configured, in a case where the characteristics information has been stored in the memory, to perform first control for not causing the image pickup unit to obtain the reference image, but causing the suppression processing unit to perform the suppression processing based on the characteristics information stored in the memory.

In a third aspect of the present invention, there is provided a method of controlling an image pickup apparatus that is used for photographing under a flicker light source, and includes a plurality of image pickup units each configured to pick up an image of an object, comprising obtaining a plurality of images by controlling driving of one of the plurality of image pickup units to perform charge accumulation and charge readout a plurality of times at predetermined time intervals according to an optical image indicative an image of the object, and detecting a flicker frequency and a flicker phase of the flicker light source according to a plurality of photometric values obtained by performing photometry in each of the plurality of images, to store the flicker frequency and the flicker phase as first flicker information in a memory, determining, at time of photographing, whether or not the first flicker information is valid, according to determination conditions set in advance, obtaining, when it is determined that the first flicker information is not valid, a plurality of images by controlling driving of another of the plurality of image pickup units to perform charge accumulation and charge readout a plurality of times at predetermined time intervals according to an optical image indicative an image of the object, and detecting a flicker frequency and a flicker phase of the flicker light source according to a plurality of photometric values obtained by performing photometry in each of the plurality of images, to store the flicker frequency and the flicker phase as second flicker information in a memory, and controlling exposure timing according to the second flicker information to perform photographing.

In a fourth aspect of the present invention, there is provided a method of controlling an image pickup apparatus, comprising calculating light amount change characteristics of light from an object, based on a plurality of photometric values obtained at a period shorter than a first period, storing characteristics information concerning the light amount change characteristics calculated by said calculating, in a memory, suppressing influence of change in an amount of light from an object, on an image acquired by an image pickup unit, and causing, in a case where the characteristics information has been stored in the memory, the image pickup unit not to perform charge accumulation while differentiating start timing on a region-by-region basis by taking more time than required to obtain the plurality of photometric values, but causing the suppression processing to be performed based on the characteristics information stored in the memory.

In a fifth aspect of the present invention, there is provided a non-transitory computer-readable storage medium storing a computer-executable program for executing a method of controlling an image pickup apparatus that is used for photographing under a flicker light source, and includes a plurality of image pickup units each configured to pick up an image of an object, wherein the method comprises obtaining a plurality of images by controlling driving of one of the plurality of image pickup units to perform charge accumulation and charge readout a plurality of times at predetermined time intervals according to an optical image indicative an image of the object, and detecting a flicker frequency and a flicker phase of the flicker light source according to a plurality of photometric values obtained by performing photometry in each of the plurality of images, to store the flicker frequency and the flicker phase as first flicker information in a memory, determining, at time of photographing, whether or not the first flicker information is valid, according to determination conditions set in advance, obtaining, when it is determined that the first flicker information is not valid, a plurality of images by controlling driving of another of the plurality of image pickup units to perform charge accumulation and charge readout a plurality of times at predetermined time intervals according to an optical image indicative an image of the object, and detecting a flicker frequency and a flicker phase of the flicker light source according to a plurality of photometric values obtained by performing photometry in each of the plurality of images, to store the flicker frequency and the flicker phase as second flicker information in a memory, and controlling exposure timing according to the second flicker information to perform photographing.

In a sixth aspect of the present invention, there is provided a non-transitory computer-readable storage medium storing a computer-executable program for executing a method of controlling an image pickup apparatus, wherein the method comprises calculating light amount change characteristics of light from an object, based on a plurality of photometric values obtained at a period shorter than a first period, storing characteristics information concerning the light amount change characteristics calculated by said calculating, in a memory, suppressing influence of change in an amount of light from an object, on an image acquired by an image pickup unit, and causing, in a case where the characteristics information has been stored in the memory, the image pickup unit not to perform charge accumulation while differentiating start timing on a region-by-region basis by taking more time than required to obtain the plurality of photometric values, but causing the suppression processing to be performed based on the characteristics information stored in the memory.

According to the present invention, it is possible to reduce the influence of flicker while suppressing a delay of a start of photographing.

Further features of the present invention will become apparent from the following description of exemplary embodiments (with reference to the attached drawings).

BRIEF DESCRIPTION OF THE DRAWINGS

FIG. 2A is a flowchart of a photographing process performed by a camera appearing in FIG. 1.

FIG. 3A is a diagram of an example of a stripe pattern caused by line flicker, which is useful in explaining the influence of the line flicker on a moving image.

FIG. 3B is a diagram of another example of the stripe pattern caused by the line flicker.

FIG. 6 is a diagram useful in explaining calculation of peak timing of flicker, which is performed by the ICPU appearing in FIG. 1 to obtain a peak value of flicker.

FIG. 8A is a diagram useful in explaining a process from moving image live view to flickerless still image photographing, which is performed by the camera appearing in FIG. 1 in a case where flicker information is valid and there is no flicker.

FIG. 8B is a diagram useful in explaining the process described with reference to FIG. 8A, which is performed when flicker information is valid and there is flicker.

FIG. 8C is a diagram useful in explaining the process described with reference to FIG. 8A, which is performed when flicker information is not valid.

FIG. 9A is a diagram useful in explaining a flicker reduction process which is performed when a moving image is photographed by the camera shown in FIG. 1, for reducing flicker of the moving image using flicker information obtained from the moving image.

FIG. 9B is a diagram of the flicker reduction process described above with reference to FIG. 9A, which is performed for reducing flicker of the moving image using flicker information obtained from a still image.

DESCRIPTION OF THE EMBODIMENTS

The present invention will now be described in detail below with reference to the accompanying drawings showing embodiments thereof.

Figure 1:
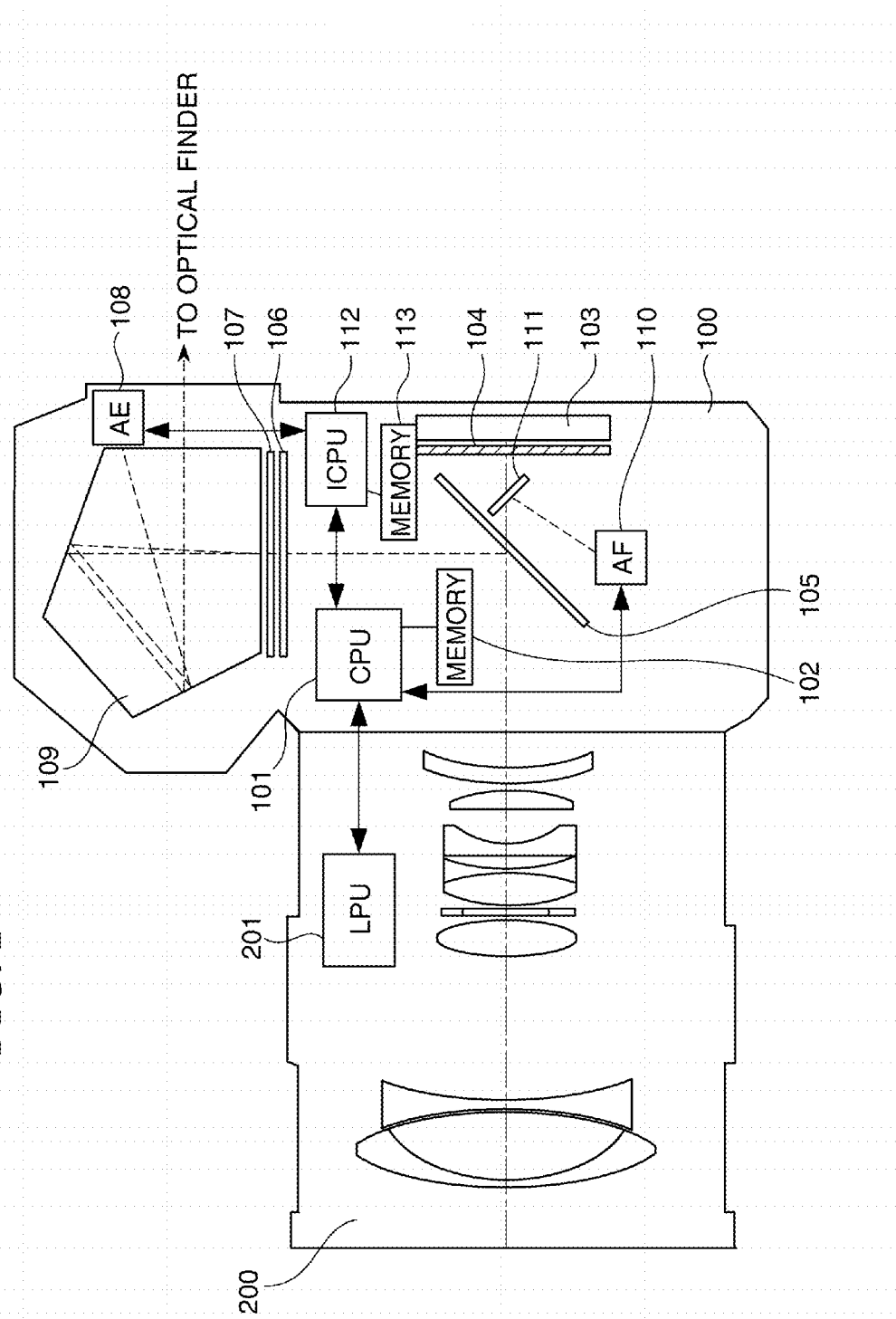
FIG. 1 is a schematic diagram of an image pickup apparatus according to an embodiment of the present invention.

FIG. 1 is a schematic diagram of an image pickup apparatus according to an embodiment of the present invention.

As shown in FIG. 1, the image pickup apparatus is e.g. a digital single-lens reflex camera (hereinafter simply referred to as "the camera"), and is used for photographing under a flicker light source. As described hereinafter, the camera includes a plurality of image pickup units.

The camera includes a camera body 100 and a photographic lens unit (hereinafter simply referred to as the "photographic lens") 200. The camera body 100 is provided with a camera microcomputer (hereinafter referred to as the "CPU") 101. The CPU 101 controls the overall operation of the camera.

A memory 102 is comprised of a RAM and a ROM, and stores programs operating on a CPU 101. Further, the memory 102 is also used as a work area for the CPU 101. An image pickup device 103 (image pickup unit) is e.g. a CCD (charged coupled device) image sensor or a CMOS (complementary metal oxide semiconductor) image sensor, and has an infrared cut filter, a low-pass filter, and so forth. When photographing, an optical image (object image) is formed on the image pickup device 103 through the photographic lens 200.

Note that in the example illustrated in FIG. 1, the image pickup device 103 selectively performs reading control of an image signal for recording a still image or a moving image and reading control of an image signal for detecting flicker.

A shutter 104 is disposed upstream of the image pickup device 103. During non-photographing, the shutter 104 blocks light to the image pickup device 103. When photographing, the shutter 104 is opened and an optical image reaches the image pickup device 103.

A half mirror 105 is disposed on the front side of the shutter 104. The half mirror 105 reflects part of light incident through the photographic lens 200 during non-photographing, and causes the reflected light to form an optical image on a focusing plate 106. A display device 107 is disposed on the rear side of the focusing plate 106.

The display device 107 is formed by a PN (polymer network) liquid crystal, and for example, an AF focus detection frame is displayed on the display device 107. This makes it possible for a user to confirm where automatic focusing is being performed when the user looks into an optical finder (not shown).

A pentaprism 109 guides the optical image formed on the focusing plate 106 to a photometric sensor (AE: automatic exposure) 108 and the optical finder. An image pickup device, such as a CCD (charged coupled device) sensor or a CMOS (complementary metal oxide semiconductor) sensor, is used as the photometric sensor 108 (image pickup unit). With this guidance of the optical image, as will be described hereinafter, not only photometry but also face detection, object tracking, and detection of characteristics of change in the amount of light from an object, which is caused by a flicker phenomenon that illumination light is periodically flickered by lighting at a power supply frequency (hereinafter referred to as "flicker detection"), are performed.

Note that in the following description, it is assumed that when flicker detection is performed on a moving image, the image pickup device 103 is used, whereas when flicker detection is performed on a still image, the photometric sensor 108 is used. That is, sensors used for flicker detection on a moving image and a still image are different.

An AF mirror 111 is disposed on an optical axis between the shutter 104 and the half mirror 105. The AF mirror 111 guides an optical image which is incident through the photographic lens 200 and passes through the half mirror 105, to a focus detection circuit 110. The focus detection circuit 110 is provided with an AF sensor, and performs focus detection according to the optical image incident through the AF mirror 111.

An ICPU 112 is a microcomputer that not only controls the driving of the photometric sensor 108 but also performs predetermined processing and computations on an image obtained from the photometric sensor 108. For example, the ICPU 112 performs face detection processing, object tracking processing, photometry processing, and flicker detection processing on an image obtained from the photometric sensor 108. A memory 113 is connected to the ICPU 112. This memory 113 includes e.g. a RAM and a ROM.

Note that although the example illustrated in FIG. 1 includes the ICPU 112 provided for the photometric sensor 108, the processing performed by the ICPU 112 may be performed by the CPU 101.

An LPU 201 is a microcomputer provided for the photographic lens 200. The LPU 201 sends e.g. distance information indicative of the distance between the camera and an object to the CPU 101.

Figure 2B:
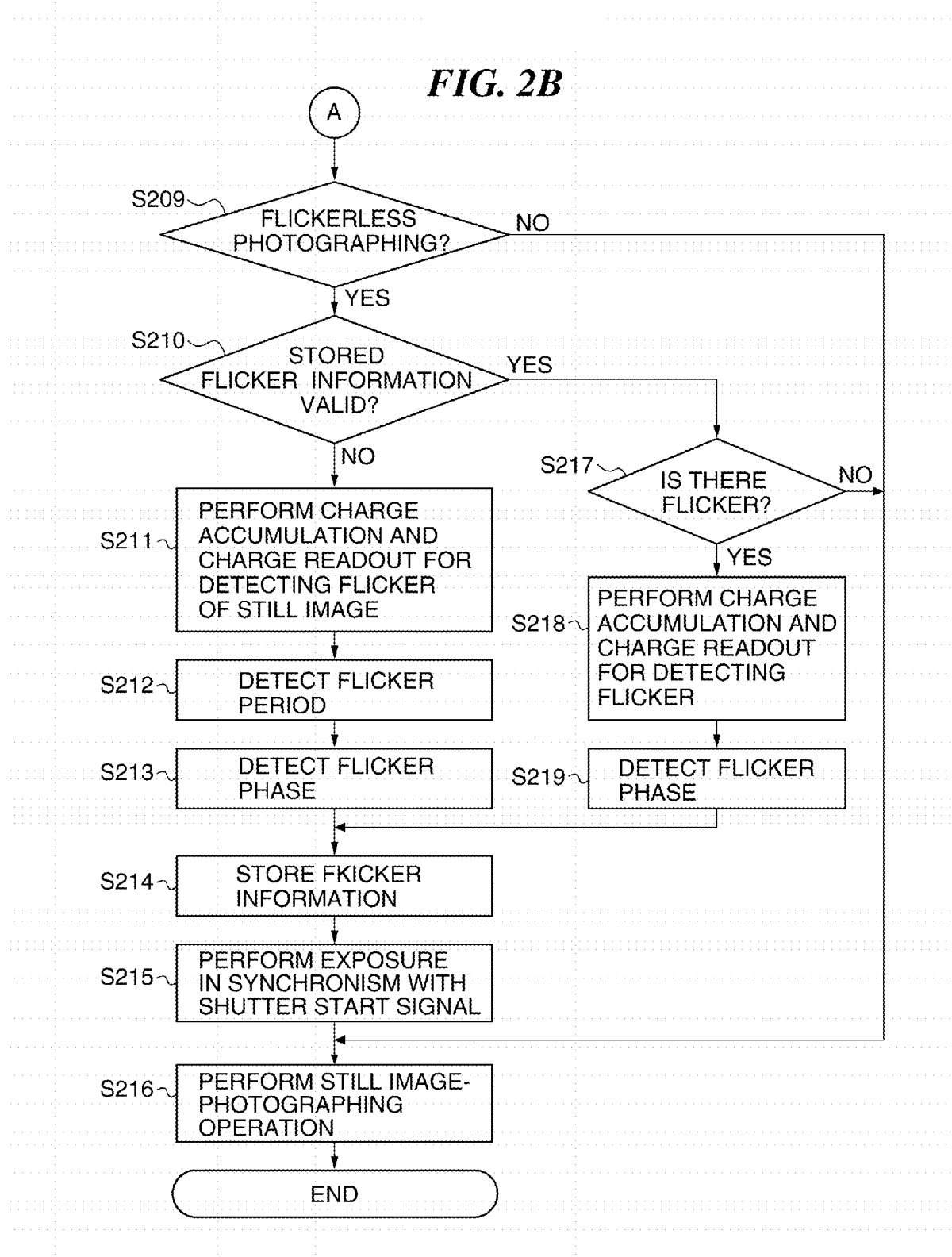
FIG. 2B is a continuation of FIG. 2A.

FIGS. 2A and 2B are a flowchart of a photographing process performed by the camera appearing in FIG. 1. Note that the photographing process described with reference to FIGS. 2A and 2B is performed under the control of the CPU 101.

When the camera is started, the camera starts a moving image live view operation. First, the CPU 101 controls the driving of the image pickup device 103 to accumulate electric charges in the image pickup device 103 and read out the electric charges from the image pickup device 103, in order to detect flicker of a moving image (step S201).

Here, a description will be given of a line flicker occurring in a moving image read out from the image pickup device 103. Note that in the illustrated example, the CMOS image sensor is used as the image pickup device 103.

Now, let it be assumed that the amount of light from the fluorescent lighting varies at a predetermined period, and charge accumulation timing in the image pickup device 103 is sequentially changed on a vertical readout line basis. In this case, an image pickup signal (image signal) read out via each vertical readout line of the image pickup device 103 changes according to the amount of light from the fluorescent lighting at the charge accumulation timing.

FIGS. 3A and 3B are diagrams useful in explaining influence of the line flicker on a moving image, in which FIG. 3A is a diagram of an example of a stripe pattern caused by the line flicker, and FIG. 3B is a diagram of another example of the stripe pattern caused by the line flicker.

Variation in the image pickup signal, i.e. the line flicker causes stripe patterns, e.g. shown in FIGS. 3A and 3B to be generated on the moving image. The intervals of stripes of the stripe patterns are associated with the light emission period of the fluorescent lighting, so that by calculating the intervals of the stripes, it is possible to calculate the period of the line flicker.

In the case of actual photographing of an object, the screen is under the influence of various kinds of reflectance. The horizontal projection of an image signal is also influenced by the reflectance of the object. More specifically, the horizontal projection of the image signal represents the amount of light from the fluorescent lighting, which undergoes a periodic change, i.e. the amount of light which varies with the line, multiplied by a reflectance, associated with each line, of the object.

Here, let it be assumed that two images A and B are obtained which have photographed the same object and in which the phase of each stripe pattern caused by the line flicker is displaced from each other by 180 degrees (see FIGS. 3A and 3B). The horizontal projections Ah and Bh of the image signals of the respective images A and B are calculated to calculate a ratio Ah/Bh using the horizontal projections Ah and Bh.

In the horizontal projection of the image signal, as far as components of the horizontal projects Ah and Bh which correspond to the reflectance of the object are concerned, the ratio Ah/Bh between the components ought to be equal to 1, because the same object is photographed. Therefore, through the use of the ratio Ah/Bh, it is possible to extract only a flicker component by removing the influence of the reflectance of the object.

Incidentally, in Japan, a commercial power supply frequency is 50 or 60 Hz. By performing readout control of the image pickup device 103 such that a moving image is read out at a repetition period of 45 msec or approximately 45 msec, i.e. at a frame rate of 22.22 . . . fps or approximately 22.22 . . . fps (that is, by performing charge accumulation and charge readout a plurality of times at predetermined time intervals), it is possible to cause two images to be successively read out such that the phases of stripe patterns caused by the line flicker are displaced from each other by approximately 180 degrees, whichever of 50 or 60 Hz may be the commercial power supply frequency.

In a case where the commercial power supply frequency is 50 Hz, the period thereof (power supply period) is 20 msec, and the period of the change in the amount of light from the fluorescent lighting is a half of the power supply period, i.e. 10 msec. Therefore, to obtain a signal which is displaced by a half period from the period of the change in the amount of light from the fluorescent lighting, it is only required to cause the signal to be read out from the image pickup device 103 e.g. at a time later by 10 msec×n+10/2 msec (n is a positive integer).

Further, in a case where the commercial power supply frequency is 60 Hz, the power supply period is 16.66 . . . msec (=1000/60 msec), and the period of the change in the amount of light from the fluorescent lighting is a half of the power supply period, i.e. 8.33 . . . msec (=1000/120 msec). Therefore, to obtain a signal which is displaced by a half period from the period of the change in the amount of light from the fluorescent lighting, it is only required to cause the signal to be read out from the image pickup device 103 e.g. at a time later by 8.33 . . . msec×m+8.33 . . . /2 msec (m is a positive integer).

For example, assuming that n=4 holds, in the case where the commercial power supply frequency is 50 Hz, after performing signal readout for one screen, next signal readout is performed 45 msec later, whereby it is possible to obtain the two images having stripe patterns caused by the line flicker, which are displaced from each other by 180 degrees. Further, assuming that m=5 holds, in the case where the commercial power supply frequency is 60 Hz, after performing signal readout for one screen, next readout is performed 45.833 . . . msec later, whereby it is possible to obtain the two images having stripe patterns caused by the line flicker, which are displaced from each other by approximately 180 degrees.

Referring again to FIG. 2A, the CPU 101 detects the flicker period (i.e. flicker frequency) of the moving image, which is an output from the image pickup device 103, to thereby obtain flicker information, referred to hereinafter (step S202).

Figure 4A:
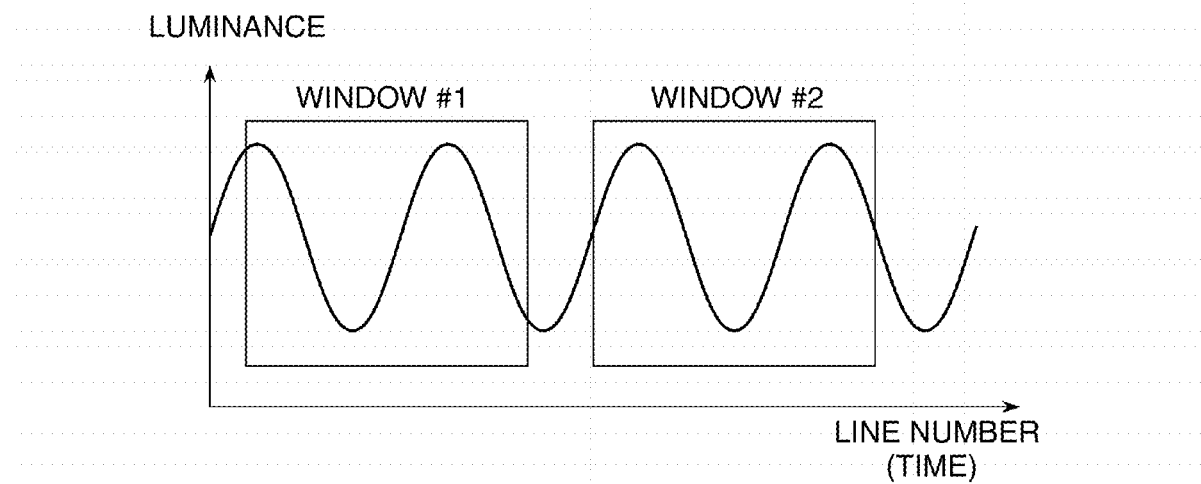
FIG. 4A is a diagram of an example of a waveform of a horizontal projection of luminance indicated by an image signal, which is useful in explaining processing performed by the camera appearing in FIG. 1 for detecting a flicker period of a moving image.
Figure 4B:
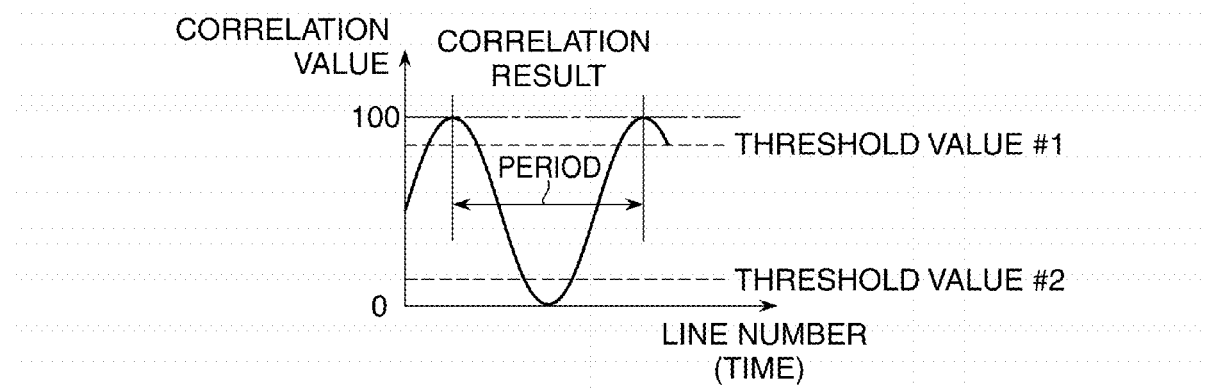
FIG. 4B is a diagram of an example of a waveform obtained by performing self-correlation on the waveform shown in FIG. 4A.

FIGS. 4A and 4B are diagrams useful in explaining detection of the flicker period of the moving image, which is performed by the camera shown in FIG. 1, in which FIG. 4A is a diagram of an example of a waveform obtained by horizontal projection, and FIG. 4B is a diagram of an example of a waveform obtained by performing self-correlation on the waveform shown in FIG. 4A.

The example shown in FIG. 4A illustrates a waveform based on the ratio Ah/Bh obtained from the horizontal projections Ah and Bh of the respective images A and B having the stripe patterns caused by the line flicker, which are displaced from each other by 180 degrees. Referring to FIG. 4A, the horizontal axis represents a serial number in the vertical direction associated with each horizontal line of the image pickup device 103 (hereinafter referred to as a "line number"). By calculating a product of the line number and time for scanning one horizontal line, it is possible to determine a photographing time in the sub-scanning direction. Further, the vertical axis represents a luminance value.

Here, if the amplitude of the waveform is larger than a predetermined amplitude, it is possible to determine that line flicker has occurred. Actually, erroneous detection of line flicker is sometimes caused e.g. by uneven illuminance of the image. To solve this problem, in the example illustrated in FIG. 4A, two windows, such as a window #1 and a window #2, for defining observation areas are set for the waveform. Then, autocorrelation between waveforms within the windows #1 and #2 is calculated, whereby a waveform based on the calculation results of the autocorrelation is obtained (FIG. 4B).

Referring to FIG. 4B, the horizontal axis represents a line number or time, and the vertical axis represents a correlation value. Note that in this example, in calculation of the autocorrelation, an autocorrelation value is calculated by displacing the waveform within the window #2 with respect to the waveform within the window #1. Further, when the peak of the waveform within the window #1 and the peak of the waveform within the window #2 coincide with each other, the correlation value is 100, and when the peak of the waveform within the window #1 and the bottom of the waveform within the window #2 coincide with each other, the correlation value is 0.

The period of the waveform appearing in FIG. 4B becomes the period of the line flicker. Further, when no line flicker has occurred, the amplitude of the waveform appearing in FIG. 4B becomes smaller. Therefore, by setting a threshold value for the correlation value of the waveform, and determining whether the amplitude becomes larger than the threshold value, it is possible to determine whether or not line flicker has occurred.

For example, a first threshold value and a second threshold value smaller than the first threshold value are set, and if the peak value of the waveform is larger than the first threshold value or if the bottom value of the waveform is smaller than the second threshold value, it is determined that line flicker has occurred. Note that the method of determining whether or not line flicker has occurred is not limited to this example, but the determination may be performed by using only the peak value of the waveform or only the bottom value of the waveform.

As described above, in the step S201, a plurality of images are obtained using a charge accumulation period and a readout period which are longer than the period of a change in the amount of light from the flicker light source (10 or 8.33 ms) and is different from an integral multiple of the period of the change in the amount of light from the flicker light source. Then, in the step S202, flicker is detected based on the plurality of images obtained in the step S201.

Referring again to FIG. 2A, the CPU 101 stores the flicker information (first flicker information) obtained in the step S202, in the memory 102 (step S203). Note that the flicker information includes e.g. a flicker period, a flicker phase (peak timing or bottom timing of the change in the amount of light, etc.), a time point at which flicker was detected, and a photometric value indicative of ambient brightness at the time of detection of the flicker.

Then, the CPU 101 determines whether or not photographing has been performed under a flicker environment, based on the flicker information (step S204). If it is determined that there is flicker (YES to the step S204), the CPU 101 performs exposure control according to an aperture value AV and an ISO sensitivity with a shutter speed (exposure time) TV fixed to an integral multiple of the flicker period, in order to reduce the influence of the flicker (step S205). The fixing of the shutter speed (exposure time) TV to the integral multiple of the flicker period corresponds to processing of suppressing the influence of change in the amount of light from an object.

On the other hand, if it is determined that there is no flicker (NO to the step S204), the CPU 101 performs exposure control according to the aperture value AV, the shutter speed TV, and the ISO sensitivity, using a normal program diagram for moving images (step S206). After performing the step S205 or 206, the CPU 101 displays the moving image live view on a display section (not shown) (step S207).

Then, the CPU 101 determines whether or not an operation for starting to photograph a still image (photographing start) has been performed (step S208). If the still image photographing start operation has not been performed (NO to the step S208), the CPU 101 returns to the step S207 to continue displaying the moving image live view.

If the still image photographing start operation has been performed (YES to the step S208), the CPU 101 determines whether or not a flickerless still image photographing mode for reducing flicker of a still image has been set (step S209 in FIG. 2B). If the flickerless still image photographing mode has been set (YES to the step S209), the CPU 101 determines whether or not the flicker information stored in the memory 102 is valid (step S210).

In the step S210, the CPU 101 determines whether or not the flicker information is valid, according to determination conditions determined in advance. For example, if there is flicker information stored in the memory 102, the CPU 101 determines that the flicker information is valid. Further to this, on condition that a time difference between a time point when flicker information was stored in the memory 102 and a current time point is not larger than a predetermined time threshold value, the CPU 101 may determine that the flicker information is valid. Further, alternatively, on condition that a photometry difference between a photometric value obtained when flicker information was stored and a current photometric value is not larger than a predetermined photometry threshold value, the CPU 101 may determine that the flicker information is valid.

If the flicker information stored in the memory 102 is not valid (NO to the step S210), the CPU 101 controls the ICPU 112 to perform charge accumulation and charge readout for still image flicker detection using the photometric sensor 108 (step S211).

Here, for example, to detect still image flicker, the CPU 101 performs the charge accumulation and charge readout twelve consecutive times at a frame rate of approximately 600 fps, at a period of approximately 1.667 ms. The frame rate of 600 fps is a common multiple of a preliminarily estimated frequency (100 or 120 Hz) of the flicker light source.

Here, a description will be given of a method of driving the photometric sensor 108 at the frame rate of approximately 600 fps (at the period of approximately 1.667 ms).

In recent years, in a single-lens reflex camera, face detection and object tracking are performed by performing predetermined processing on an image signal obtained by the photometric sensor 108 immediately before photographing. Further, photometry is performed according to the image signal obtained by the photometric sensor 108.

To perform face detection or the like, it is necessary to use a photometric sensor, such as a CCD image sensor or a CMOS image sensor, which has pixels the number of which corresponds to at least that of QVGA (quarter video graphics array) or so. To perform readout control of all pixels of a photometric sensor having pixels the number of which is equal to or larger than that of QVGA at a frame rate of not lower than approximately 600 fps, it is possible to employ a method of "increasing a driving frequency", a method of "arranging a large number of A/D converters", or the like, but these methods complicate a circuit configuration, and further increase the costs.

To solve this problem, when face detection or object tracking is performed, readout control is performed such that much time is taken to read out all the pixels of the photometric sensor, and when flicker detection is performed, the frame rate is adjusted to approximately 600 fps (period of approximately 1.667 ms) by performing pixel addition reading control or pixel thinning reading control for the photometric sensor.

After performing charge accumulation and charge readout for still image flicker detection, the CPU 112 detects a period of flicker (step S212).

Figure 5A:
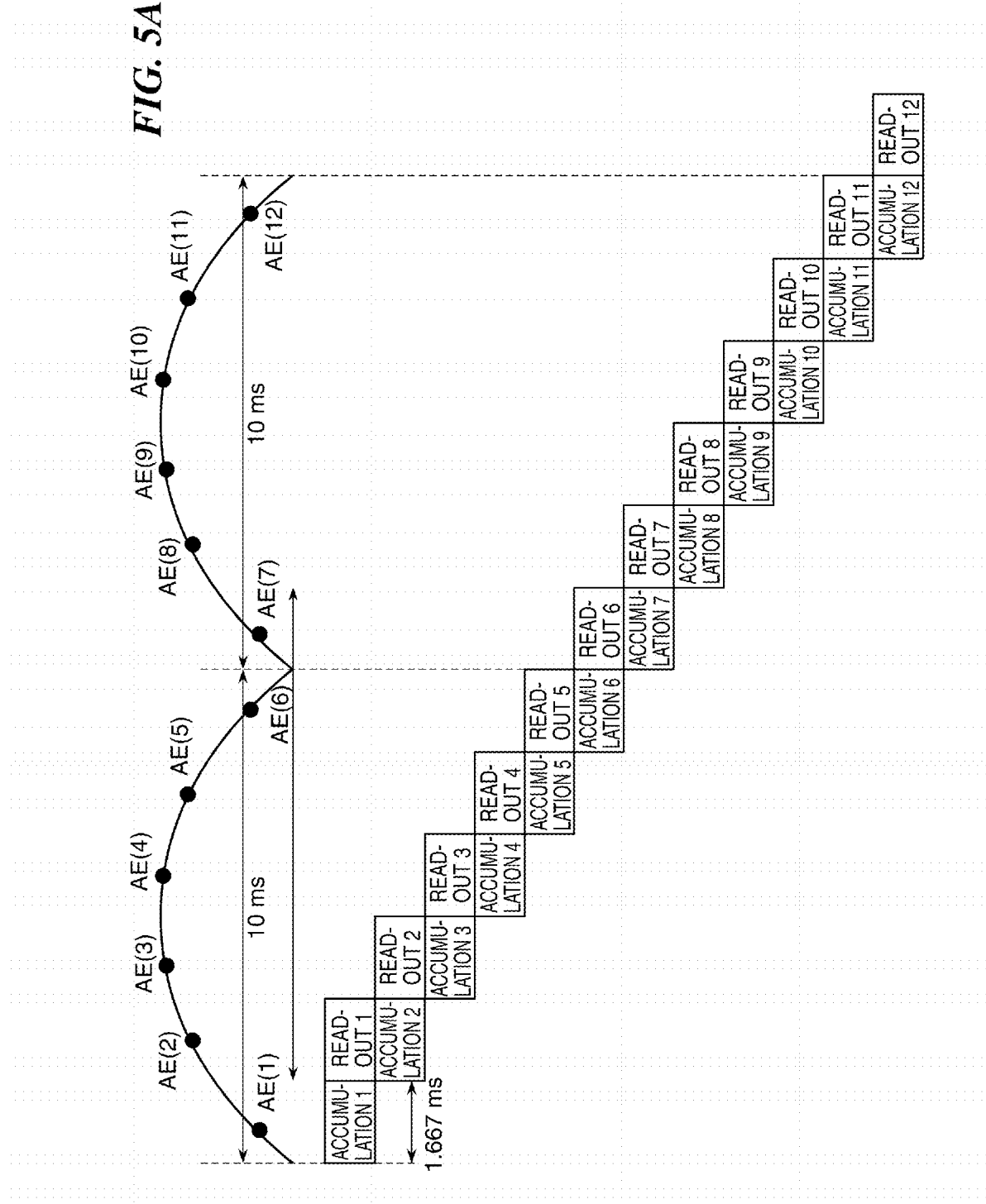
FIG. 5A is a diagram of an example of charge accumulation control performed when flicker has been detected in flicker detection by an ICPU appearing in FIG. 1, and photometric values obtained by the charge accumulation control.

FIG. 5A is a diagram of an example of charge accumulation control performed in flicker detection by the ICPU 112 appearing in FIG. 1 and photometric values obtained by the charge accumulation control. Further, FIG. 5B is a diagram of another example of the charge accumulation control performed in flicker detection by the ICPU 112 appearing in FIG. 1 and photometric values obtained by the charge accumulation control.

FIG. 5A shows charge accumulation control and photometric values obtained thereby, when there is flicker in the case of the commercial power supply frequency being 50 Hz. In the illustrated example, since charge accumulation is performed over a limited time period, the photometric value is represented by a value obtained at a center of an accumulation time period. Further, n-th accumulation is referred to as the "accumulation n", readout of the accumulation n is referred to as the "readout n", and a photometric value obtained from the result of the readout n is referred to as "AE(n)" (n is a positive integer).

In this example, a flicker light emission period is approximately 10 ms, and 10÷1.667≈6 holds. Therefore, the same photometric value is obtained every six times, irrespective of the charge accumulation timing. That is, there is a relationship of AE(n)=AE(n+6).

Figure 5B:
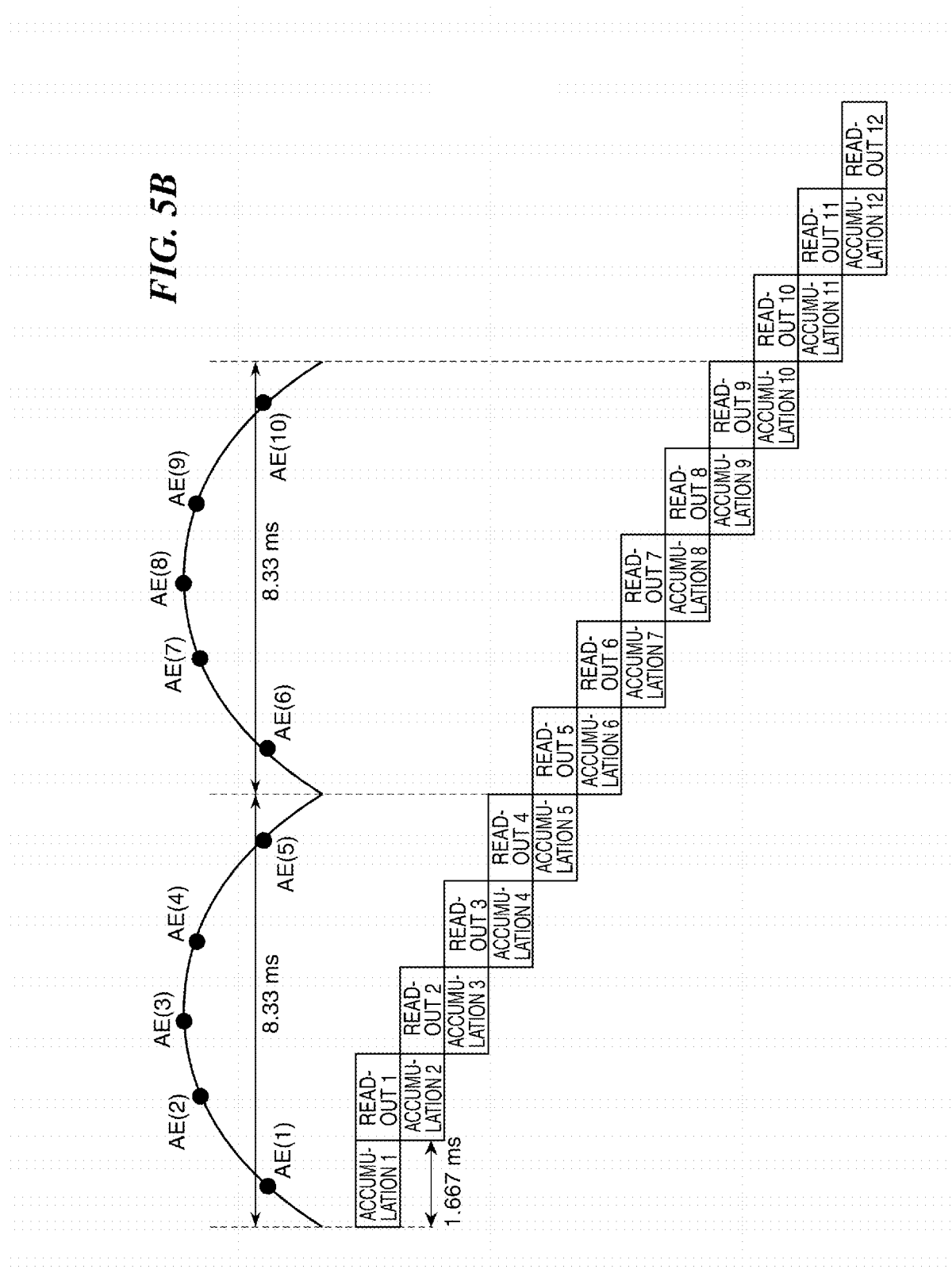
FIG. 5B is a diagram of another example of the charge accumulation control performed when flicker has been detected in flicker detection by the ICPU appearing in FIG. 1, and photometric values obtained by the charge accumulation control.

FIG. 5B shows charge accumulation control and photometric values obtained thereby, when there is flicker in the case of the commercial power supply frequency being 60 Hz. When the commercial power supply frequency is 60 Hz, a flicker light emission period is approximately 8.33 ms, and 8.33/1.667≈5 holds. Therefore, in this example, the same photometric value is obtained every five times, i.e. there is a relationship of AE(n)=AE(n+5).

Note that under a photographing environment where there is no flicker, AE(n) is approximately constant irrespective of the number n of times of accumulation.

Here, assuming that a flicker evaluation value (hereinafter simply referred to as the "evaluation value") in the case of the aforementioned commercial power supply frequency being 50 Hz is represented by F50, and a flicker evaluation value in the case of the commercial power supply frequency being 60 Hz is represented by F60, the evaluation values F50 and F60 are expressed by the following equations (1) and (2):

$$F50 = \sum_{i=1}^{6} |AE(n) - AE(n+6)| \quad (1)$$

$$F60 = \sum_{i=1}^{6} |AE(n) - AE(n+5)| \quad (2)$$

Assuming that a predetermined flicker detection threshold value (hereinafter simply referred to as the "threshold value") is represented by F_th, in a case where F50<F_th and also F60<F_th hold, no flicker is detected. Further, in a case where F50<F_th and also F60≥F_th hold, it means that flicker at the light emission period T=10 ms (the commercial power supply frequency: 50 Hz) is detected (i.e. photographing has been performed under a flicker environment).

Further, in a case where F50≥F_th and also F60<F_th hold, it indicates that photographing has been performed under a flicker environment of the light emission period T=8.33 ms (the commercial power supply frequency: 60 Hz).

Incidentally, both the evaluation values F50 and F60 are sometimes made equal to or larger than the threshold value F_th e.g. due to panning or motion of an object. Therefore, in a case where both the evaluation values F50 and F60 are not smaller than the threshold value F_th, the magnitudes of the evaluation values F50 and F60 are compared with each other. If the evaluation value F50 is not larger than the evaluation value F60, it is determined that photographing has been performed under a flicker environment of the light amount change period T=10 ms (the commercial power supply frequency: 50 Hz).

On the other hand, when the evaluation value F50 is larger than the evaluation value F60, it is determined that photographing has been performed under the flicker environment of the light amount change period T=8.33 ms (the commercial power supply frequency: 60 Hz). More specifically, in the case of F50≥F_th and also F60≥F_th, if F50≤F60 holds, it is determined that the photographing has been performed under the flicker environment of the light amount change period T=10 ms (the commercial power supply frequency: 50 Hz). On the other hand, if F50>F60 holds, it is determined that photographing has been performed under the flicker environment of the light amount change period T=8.33 ms (the commercial power supply frequency: 60 Hz).

Note that in the case where F50≥F_th and also F60≥F_th hold, flicker detection may be performed again, by determining that the reliability of results of flicker detection is too low.

Then, in the case of occurrence of flicker, the ICPU 112 detects the phase of the flicker (flicker phase) (step S213). To calculate the phase of the flicker, the ICPU 112 interpolates photometric values obtained by the charge accumulation and the charge readout performed twelve consecutive times, and determines a peak timing at which the light amount of the flicker becomes highest, and sets the peak timing as the phase of the flicker.

FIG. 6 is a diagram useful in explaining calculation of the peak timing of flicker, which is performed by the ICPU appearing in FIG. 1.

First, a point where the largest output (photometric value) of photometric values AE(1) to AE(12) was obtained is represented by P2 (t(m), AE(m)). Then, an immediately preceding point before the P2 (t(m), AE(m)) at which a photometric value was obtained is represented by P1 (t(m−

1), AE(m−1)). Further, an immediately following point after the P2 (t(m), AE(m)) at which a photometric value was obtained is represented by P3 (t(m+1), AE(m+1)).

Here, a straight line extending through a point having the smaller one of the photometric value AE(m−1) and the photometric value AE(m+1) (the point P1 in the example illustrated in FIG. 6) and the point P2 is expressed by a linear equation: L1=at+b. Further, a straight line extending through a point having the larger one of the photometric value AE(m−1) and the photometric value AE(m+1) (the point P3 in the example illustrated in FIG. 6) and having a slope "−a" is expressed by a linear equation L2. Then, by calculating a point of intersection between the straight lines L1 and L2, the peak timing t_peak of the light amount of the flicker and a photometric value AE_peak at the peak timing can be calculated, assuming that a flicker detection start time is 0 ms.

Note that although in the above-described example, the peak timing of the light amount of the flicker is calculated, the bottom timing of the light amount of the flicker may be calculated.

As described above, in the step S211, a plurality of photometric values are obtained at a readout period which is shorter than the light amount change period (10 or 8.33 ms) of the flicker light source. Then, in the step S212 or S213, flicker detection is performed based on the photometric values obtained in the step S211.

After execution of the step S213, the ICPU 112 stores the flicker period (i.e. the flicker frequency) and the flicker phase as flicker information (second flicker information) in the memory 113 (step S214). The ICPU 112 generates a flicker synchronization signal according to the flicker period and the flicker phase (i.e. the peak timing) stored in the step S214. Then, the CPU 101 starts exposure by controlling exposure timing using a shutter start signal generated with reference to the flicker synchronization signal (step S215).

Figure 7:
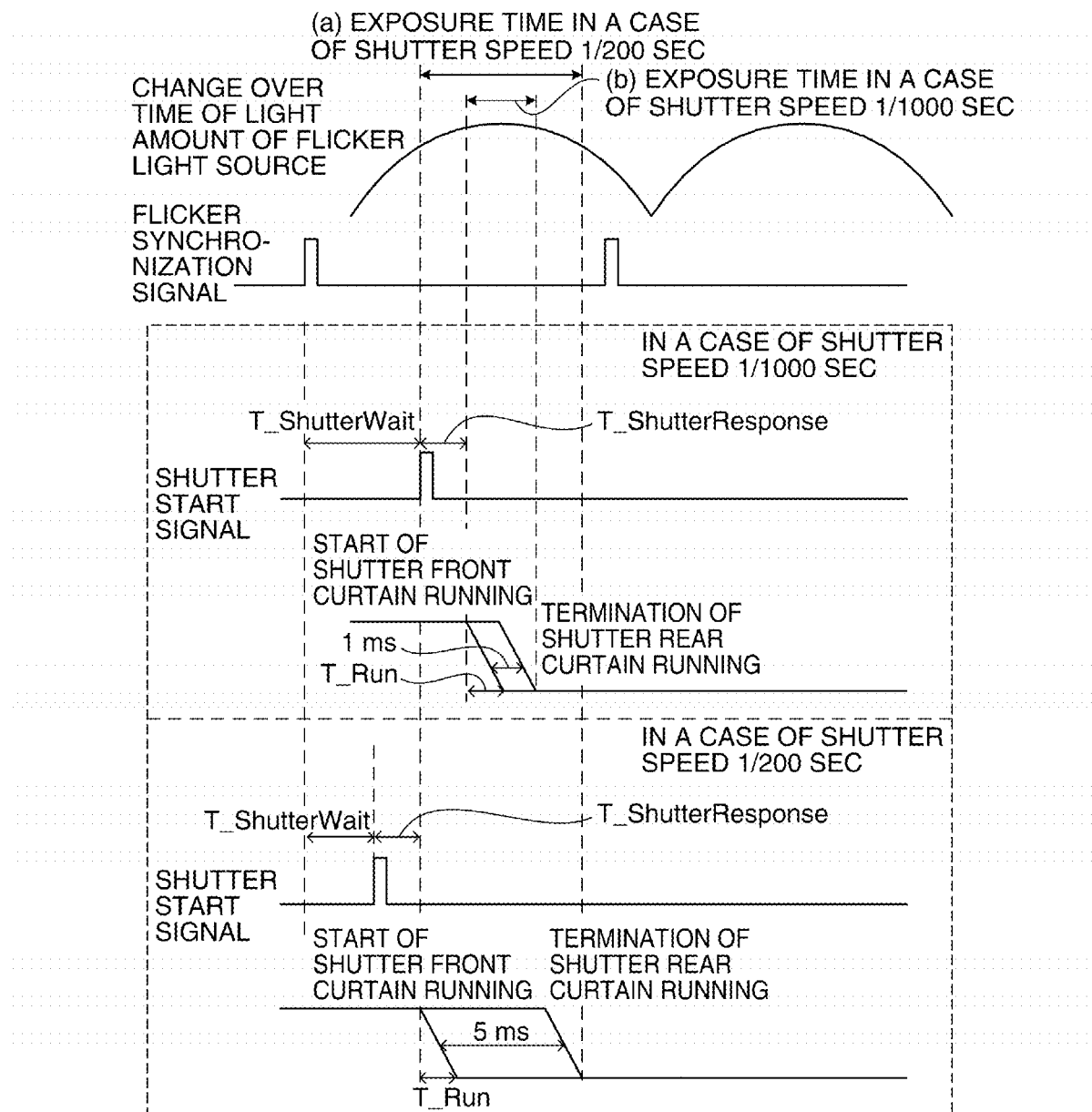
FIG. 7 is a diagram useful in explaining a shutter start signal generated by the camera appearing in FIG. 1.

FIG. 7 is a diagram useful in explaining the shutter start signal generated by the camera appearing in FIG. 1.

Referring to FIG. 7, the ICPU 112 generates the flicker synchronization signal for each flicker period. The flicker synchronization signal is a signal for synchronization with predetermined timing of flicker. Now, let it be assumed that a wait time after delivery of the flicker synchronization signal until delivery of the shutter start signal is represented by T_ShutterWait. Further, a time lag from the output of the shutter start signal to running of the shutter is represented by T_ShutterResponse, and a time period over which the shutter runs from one end to the other end of the image pickup device 103 is represented by T_Run.

In the illustrated example, the CPU 101 changes the wait time T_ShutterWait according to the shutter speed. With this change, the CPU 101 delivers the shutter start signal such that peak timing at which there is little change in the light amount of the flicker is at the center of time between the start of shutter front curtain running and the termination of shutter rear curtain running.

Here, the period T and phase (peak timing) t_peak of the flicker are known, and hence, assuming that the flicker detection start time is 0 ms, generation timing t_Flicker of the flicker synchronization signal can be represented by the following equation (3):

$$t\_Flicker = t\_peak - T\_ShutterResponse - (T\_Run + TVmax)/2 + T \times n \quad (3)$$

wherein n represents a natural number, and TVmax represents a shutter speed (exposure time) with reference to which whether or not to take countermeasure against the flicker is determined.

Incidentally, in a case where the shutter speed TV is lower than 1/100 sec, exposure is performed over a time period including one or more periods of the flicker. This reduces the influence of variation in the exposure caused by the flicker. Therefore, the countermeasure against the flicker is taken in a case where the shutter speed TV is higher than 1/100 sec.

Further, when the shutter speed TV is approximately 9 ms, electric charges corresponding to approximately one period of the flicker are accumulated. This makes it possible to perform stable exposure even under the flicker environment. Therefore, in this example, the countermeasure against the flicker is taken when the shutter speed TV is higher than 8 ms. That is, TVmax is set to 1/125 sec (8 ms) (TVmax=1/125 sec (8 ms)).

Further, by setting the wait time T_ShutterWait such that T_ShutterWait=(TVmax−TV)/2 (TV<1/125 sec) holds, the configuration can be made such that the peak timing of the flicker is at the center of the time between the start of the shutter front curtain running and the termination of the shutter rear curtain running.

Upon receipt of the flicker synchronization signal, the CPU 101 delivers the shutter start signal after the lapse of the wait time T_ShutterWait dependent on the shutter speed TV. The shutter 104 is driven by the shutter start signal, whereby exposure is started.

Here, upon receipt of the flicker synchronization signal, the CPU 101 delivers the shutter start signal after the lapse of the wait time T_ShutterWait dependent on the shutter speed TV. Therefore, as shown in FIG. 7, even when the shutter speed TV is 1/100 sec or 1/200 sec, the peak timing of the flicker is at the center of the time between the start of the shutter front curtain running and the termination of the shutter rear curtain running.

Referring again to FIG. 2B, after execution of the step S215, the CPU 101 performs a still image-photographing operation (step S216), followed by terminating the present process.

On the other hand, if the flicker information stored in the memory 102 is valid (YES to the step S210), the CPU 101 determines based on the flicker information whether or not photographing has been performed under the flicker environment (step S217). If photographing has been performed not under the flicker environment (NO to the step S217), the CPU 101 proceeds to the step S216, and performs the still image-photographing operation with normal exposure according to predetermined exposure conditions of the aperture value AV, the shutter speed TV, and the ISO sensitivity.

On the other hand, if photographing has been performed under the flicker environment (YES to the step S217), the CPU 101 controls the ICPU 112 to perform charge accumulation and charge readout for still image flicker detection using the photometric sensor 108 (step S218). Then, under the control of the CPU 101, the ICPU 112 detects the phase of the flicker according to an output from the photometric sensor 108, as described hereinabove (step S219). After that, the ICPU 112 proceeds to the step S214. Note that, in this case, since the flicker period is known using the flicker information stored in the memory 102, detection of the flicker period is not performed anew.

If the flickerless still image photographing mode is not set (NO to the step S209), the CPU 101 proceeds to the step S216 to perform the still image-photographing operation with the normal exposure.

FIGS. 8A to 8C are diagrams useful in explaining a process from moving image live view to flickerless still image photographing, which is performed by the camera shown in FIG. 1. FIG. 8A is a diagram for explaining the process performed when flicker information is valid and there is no flicker, FIG. 8B is a diagram for explaining the process performed when the flicker information is valid and there is flicker, and FIG. 8C is a diagram for explaining the process performed when the flicker information is not valid.

In the case of FIG. 8A, detection of the flicker period of a moving image is performed before the start of the live view of the moving image. Since flicker information stored in the memory 102 is valid and there is no flicker, flickerless still image photographing is started without performing flicker detection on a still image (i.e. an output from the photometric sensor 108).

In the case of FIG. 8B, the flicker information stored in the memory 102 is valid and there is flicker. In this case, only flicker phase detection is performed immediately before photographing a still image, and then flickerless still image photographing is started.

In the case of FIG. 8C, since the flicker information stored in the memory 102 is not valid, flicker period detection the and flicker phase detection are both performed immediately before photographing a still image, and then flickerless still image photographing is started.

As described above, in the embodiment of the present invention, flicker information obtained from moving image live view is taken over for use in photographing a still image, and hence it is possible to shorten time required before the start of flickerless still image photographing.

Although in the above-described example, flicker information obtained from moving image live view is taken over for use in photographing a still image, flicker information obtained from a still image may be used for correction of flicker in photographing a moving image.

FIGS. 9A and 9B are diagrams useful in explaining a flicker reduction process performed when a moving image is photographed by the camera appearing in FIG. 1. FIG. 9A is a diagram useful in explaining a flicker reduction process which is performed for reducing flicker of a moving image using flicker information obtained from the moving image, whereas FIG. 9B is a diagram useful in explaining a flicker reduction process which is performed for reducing flicker of a moving image (for performing suppression processing for suppressing influence of change in an amount of light from an object) using flicker information obtained from a still image (characteristics information concerning light amount change characteristics of light from an object).

In the case of FIG. 9A, when moving image live view is started first time, there is no flicker information stored in the memory 102. Therefore, the CPU 101 is necessarily required to perform flicker detection. Flicker information obtained by the flicker detection is used for correcting exposure of moving images, for the moving image live view performed the first time and subsequent times.

In the case of FIG. 9B, when moving image live view is started first time, if flicker information obtained from the still image is stored in the memory 102, there is no need to perform the flicker detection process on the moving image. Therefore, obtaining of an image (reference image) is not performed through charge accumulation using the image pickup device 103 while differentiating start timing on a region-by-region basis by taking more time than required to obtain a plurality of photometric values by the photometric sensor 108, and hence it is possible to shorten time taken to start moving image live view. Further, also when moving image live view is started second and subsequent times, it is possible to use latest flicker information detected by the preceding detection, which makes it possible to perform reliable exposure control.

As described heretofore, by taking over flicker information obtained from a still image so as to perform the flicker reduction process on a moving image, it is possible to shorten time taken to start moving image live view, and what is more, perform exposure control with high accuracy.

As is apparent from the above description, in the example illustrated in FIG. 1, the CPU 101 functions as a first flicker detection unit, a determination unit, and first and second control units, and the ICPU 112 functions as a second flicker detection unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-136622 filed Jul. 2, 2014 which is hereby incorporated by reference herein in its entirety.

What is claimed is:
1. An image pickup apparatus comprising:
an image pickup unit; and
at least one processor configured to perform:
first calculating light amount change characteristics of light from an object, based on a plurality of photometric values obtained at a period shorter than a first period;
second calculating the light amount change characteristics, based on luminance change information with a reference image, the reference image being an image obtained through charge accumulation using said image pickup unit while differentiating start timing on a region-by-region basis by taking more time than required to obtain the plurality of photometric values by said image pickup unit;

storing characteristics information concerning the light amount change characteristics calculated in a memory based on the plurality of photometric values by said first calculating;

suppression processing for suppressing influence of change in an amount of light from an object, on an image acquired by said image pickup unit; and in a case where the characteristics information has been stored in said memory, first controlling for not causing said image pickup unit to obtain the reference image, but causing said suppression processing based on the characteristics information stored in said memory.

2. The image pickup apparatus according to claim 1, wherein said at least one processor performs, in a case where the characteristics information has not been stored in said memory, second controlling for causing said image pickup unit to obtain the reference image, causing said second calculating the light amount change characteristics based on the obtained reference image, and causing said suppression processing based on the calculated light amount characteristics.

3. The image pickup apparatus according to claim 1, wherein said at least one processor performs, in a case where the characteristics information has been stored in said memory, and a time period elapsed after the characteristics information was stored in said memory is not more than a threshold value, the first controlling, and performs, in a case where the characteristics information has been stored in said memory, and the time period elapsed after the characteristics information was stored in said memory is more than the threshold value, second controlling for causing said image pickup unit to obtain the reference image, causing said second calculating the light amount change characteristics based on the obtained reference image, and causing said suppression processing based on the calculated light amount characteristics.

4. The image pickup apparatus according to claim 1, wherein in a case where the characteristics information stored in said memory indicates that the change in the amount of light does not occur, said at least one processor performs first controlling for not causing said suppression processing.

5. The image pickup apparatus according to claim 1, wherein said suppression processing controls charge accumulation time of said image pickup unit for obtaining a moving image.

6. The image pickup apparatus according to claim 1, wherein said suppression processing is also capable of performing, based on the light amount change characteristics calculated by said first calculating, suppressing influence of change in the amount of light from the object, on a still image obtained using said image pickup unit.

7. The image pickup apparatus according to claim 6, wherein said suppression processing controls timing for charge accumulation of said image pickup unit for obtaining a still image, based on the light amount change characteristics calculated by said first calculating.

8. The image pickup apparatus according to claim 1, wherein the first period is $1/120$ seconds.

9. A method of controlling an image pickup apparatus, comprising:

first calculating light amount change characteristics of light from an object, based on a plurality of photometric values obtained at a period shorter than a first period;

second calculating the light amount change characteristics, based on luminance change information with a reference image, the reference image being an image obtained through charge accumulation using an image pickup unit while differentiating start timing on a region-by-region basis by taking more time than required to obtain the plurality of photometric values by said image pickup unit;

storing characteristics information concerning the light amount change characteristics calculated in a memory based on the plurality of photometric values by said first calculating;

suppressing influence of change in an amount of light from an object, on an image acquired by the image pickup unit; and causing, in a case where the characteristics information has been stored in the memory, controlling for not causing said image pickup unit to obtain the reference image, but causing said suppression processing based on the characteristics information stored in the memory.

10. A non-transitory computer-readable storage medium storing a computer-executable program for executing a method of controlling an image pickup apparatus, wherein the method comprises:

first calculating light amount change characteristics of light from an object, based on a plurality of photometric values obtained at a period shorter than a first period;

second calculating the light amount change characteristics, based on luminance change information with a reference image, the reference image being an image obtained through charge accumulation using an image pickup unit while differentiating start timing on a region-by-region basis by taking more time than required to obtain the plurality of photometric values by said image pickup unit;

storing characteristics information concerning the light amount change characteristics calculated in a memory based on the plurality of photometric values by said first calculating;

suppressing influence of change in an amount of light from an object, on an image acquired by the image pickup unit; and causing, in a case where the characteristics information has been stored in the memory, controlling for not causing said image pickup unit to obtain the reference image, but causing said suppression processing based on the characteristics information stored in the memory.

* * * * *